United States Patent
Phinizy et al.

(10) Patent No.: US 12,499,528 B2
(45) Date of Patent: Dec. 16, 2025

(54) OBJECT DAMAGE IDENTIFICATION USING MODELING BASED ON THREE-DIMENSIONAL SCANNING

(71) Applicant: Capital One Services, LLC, McLean, VA (US)

(72) Inventors: John Phinizy, Midlothian, VA (US); Chih-Hsiang Chow, Coppell, TX (US)

(73) Assignee: Capital One Services, LLC, McLean, VA (US)

( * ) Notice: Subject to any disclaimer, the term of this patent is extended or adjusted under 35 U.S.C. 154(b) by 165 days.

(21) Appl. No.: 18/461,302

(22) Filed: Sep. 5, 2023

(65) Prior Publication Data

US 2025/0078236 A1     Mar. 6, 2025

(51) Int. Cl.
*G06T 7/00* (2017.01)
*G06T 19/00* (2011.01)

(52) U.S. Cl.
CPC .......... *G06T 7/0002* (2013.01); *G06T 19/006* (2013.01); *G06T 2200/24* (2013.01); *G06T 2207/10028* (2013.01); *G06T 2207/20081* (2013.01); *G06T 2207/20104* (2013.01)

(58) Field of Classification Search
None
See application file for complete search history.

(56) References Cited

U.S. PATENT DOCUMENTS

| | | | |
|---|---|---|---|
| 10,970,835 B1 | 4/2021 | Price et al. | |
| 10,976,262 B2 | 4/2021 | Ozim | |
| 11,120,506 B1 | 9/2021 | Devereaux et al. | |
| 11,333,615 B2 | 5/2022 | Grauzinis et al. | |
| 2017/0068756 A1* | 3/2017 | Wilsher | G06F 30/20 |
| 2017/0147990 A1 | 5/2017 | Franke et al. | |
| 2024/0095911 A1* | 3/2024 | Taneja | G06V 20/188 |
| 2024/0119550 A1* | 4/2024 | Stockert | G06N 10/20 |

OTHER PUBLICATIONS

"Hand-guided qualitative deflectometry with a mobile device", 17 pages, retrieved on Sep. 5, 2023, available at https://opg.optica.org/oe/fulltext.cfm?uri=oe-28-7-9027&id=429104.

"Powered by AI, Automated vehicle damage detection and image augmentation", 8 pages, retrieved on Sep. 5, 2023, available at https://degould.com/powered-by-ai/.

* cited by examiner

*Primary Examiner* — Tapas Mazumder
(74) *Attorney, Agent, or Firm* — Harrity & Harrity, LLP (57) ABSTRACT

In some implementations, a device may obtain scan data associated with an object, where the scan data includes a three-dimensional representation of a surface of the object. The device may identify one or more damaged regions of the object based on the scan data. The device may align the scan data with model data associated with a three-dimensional model representative of the object. The device may generate virtual content including: an object representation that includes an overlay of the three-dimensional representation of the surface of the object on the three-dimensional model representative of the object, based on alignment of the scan data with the model data; and one or more content items indicating locations of the one or more damaged regions with respect to the object representation. The device may cause presentation of the virtual content in a user interface of a user device.

20 Claims, 8 Drawing Sheets

OBJECT DAMAGE IDENTIFICATION USING MODELING BASED ON THREE-DIMENSIONAL SCANNING

BACKGROUND

Three-dimensional (3D) scanning enables the collection of 3D data relating to the appearance of a real-world object or environment. The 3D data may be used to construct a 3D model of the object or environment.

SUMMARY

Some implementations described herein relate to a system for object damage identification. The system may include one or more memories and one or more processors communicatively coupled to the one or more memories. The one or more processors may be configured to obtain scan data associated with an object, where the scan data includes a three-dimensional representation of a surface of the object. The one or more processors may be configured to identify, using one or more machine learning models, one or more damaged regions of the object based on the scan data. The one or more processors may be configured to align the scan data with model data associated with a three-dimensional model representative of the object. The one or more processors may be configured to generate virtual content including: an object representation that includes an overlay of the three-dimensional representation of the surface of the object on the three-dimensional model representative of the object, based on alignment of the scan data with the model data; and one or more content items indicating locations of the one or more damaged regions with respect to the object representation. The one or more processors may be configured to cause presentation of the virtual content in a user interface of a user device.

Some implementations described herein relate to a method of object damage identification. The method may include obtaining, by a device, scan data associated with an object, where the scan data includes a three-dimensional representation of a surface of the object. The method may include identifying, by the device, one or more damaged regions of the object based on the scan data. The method may include aligning, by the device, the scan data with model data associated with a three-dimensional model representative of the object. The method may include generating, by the device, virtual content including: an object representation that includes an overlay of the three-dimensional representation of the surface of the object on the three-dimensional model representative of the object, based on alignment of the scan data with the model data; and one or more content items indicating locations of the one or more damaged regions with respect to the object representation. The method may include causing, by the device, presentation of the virtual content in a user interface of a user device.

Some implementations described herein relate to a non-transitory computer-readable medium that stores a set of instructions for object damage identification. The set of instructions, when executed by one or more processors of a device, may cause the device to obtain scan data associated with an object, where the scan data includes a three-dimensional representation of a surface of the object. The set of instructions, when executed by one or more processors of the device, may cause the device to identify one or more damaged regions of the object based on the scan data. The set of instructions, when executed by one or more processors of the device, may cause the device to generate virtual content including: an object representation that includes at least one of the three-dimensional representation of the surface of the object or a three-dimensional model representative of the object; and one or more content items indicating locations of the one or more damaged regions with respect to the object representation. The set of instructions, when executed by one or more processors of the device, may cause the device to cause presentation of the virtual content in a user interface of a user device.

DETAILED DESCRIPTION

The following detailed description of example implementations refers to the accompanying drawings. The same reference numbers in different drawings may identify the same or similar elements.

Image processing techniques, such as computer vision techniques and/or image segmentation techniques, can be used to identify features of objects depicted in an image. For example, an image of an object may be analyzed using an image processing technique to identify damage to the object. However, an effectiveness of the image processing technique in identifying the damage may be limited by a resolution of the image, a perspective of the image, a lighting when the image was captured, or the like. For example, analysis of the image using the image processing technique may fail to detect small blemishes and imperfections on the object. Moreover, image processing may consume significant computing resources (e.g., processor resources and/or memory resources). Thus, expending the computing resources to process the image, but failing to detect all the damage to the object, is an inefficient utilization of the computing resources.

On the other hand, a three-dimensional (3D) scanning technique, such as deflectometry, can be used to detect fine variations in an object's surface. However, in contrast to image processing, the 3D scanning technique may function without context as to features of the object. Thus, while the 3D scanning technique may be capable of detecting small blemishes and imperfections, the 3D scanning technique may be unable to differentiate between damage to the object and intentional features of the object and/or unable to identify the parts of the object where the damage is located (e.g., which may be relevant to downstream analysis of the damage). Moreover, 3D scanning may also consume significant computing resources. Thus, expending the computing resources to scan the object, but failing to differentiate damage from intentional features and/or failing to identify the parts of the object that are damaged, is an inefficient utilization of the computing resources.

Some implementations described herein enable identification of damage to an object using a combination of image processing, 3D scanning, and/or 3D modeling. In some implementations, a system may obtain scan data that includes a 3D representation of a surface of an object. For example, the scan data may be captured by a handheld, mobile user device using deflectometry. The system may process the scan data to identify damaged regions of the object, including regions associated with small or minor damage, which otherwise might be undetected by image processing. In some implementations, the system may also obtain image data including one or more images representative of the object (e.g., one or more images of the object or of an interchangeable object). The system may align the scan data with the image data to correlate the 3D representation of the surface of the object with the one or more images. Because the system can use image processing on the image(s) to identify parts of the object, aligning the scan data and the image data enables the system to generate a mapping of the damaged regions to parts of the object.

Furthermore, the system may generate (e.g., using the image data) or obtain a 3D model representative of the object (e.g., a 3D model of the object or of an interchangeable object). The system may also align the scan data with model data associated with the 3D model. Based on the alignment of the scan data with the model data, the system may generate virtual content for presentation in a user interface. The virtual content may include an object representation that includes an overlay of the 3D representation of the surface of the object on the 3D model. The object representation provides a visualization showing where the damaged regions are located on the object. Furthermore, because the depiction of the damaged regions are based on the scan data (rather than based on images of the object), the damaged regions can be viewed clearly at deep zoom levels. The virtual content may also include one or more content items (e.g., based on the mapping of damaged regions to parts of the object) that indicate locations of the damaged regions with respect to the object representation.

In this way, the damaged regions can be identified with a high degree of accuracy based on the scan data obtained from 3D scanning. Furthermore, by aligning the scan data with the image data and/or the model data, the image data and/or the model data can be used to differentiate the damaged regions from intentional features of the object and/or to identify locations on the object where the damaged reasons are present. Accordingly, the system described herein provides improved detection of damage to an object, thereby efficiently utilizing computing resources.

FIGS. 1A-1E are diagrams of an example 100 associated with object damage identification using modeling based on 3D scanning. As shown in FIGS. 1A-1E, example 100 includes an entity device, a modeling system, and a user device. These devices are described in more detail in connection with FIGS. 2 and 3.

Figure 1A:
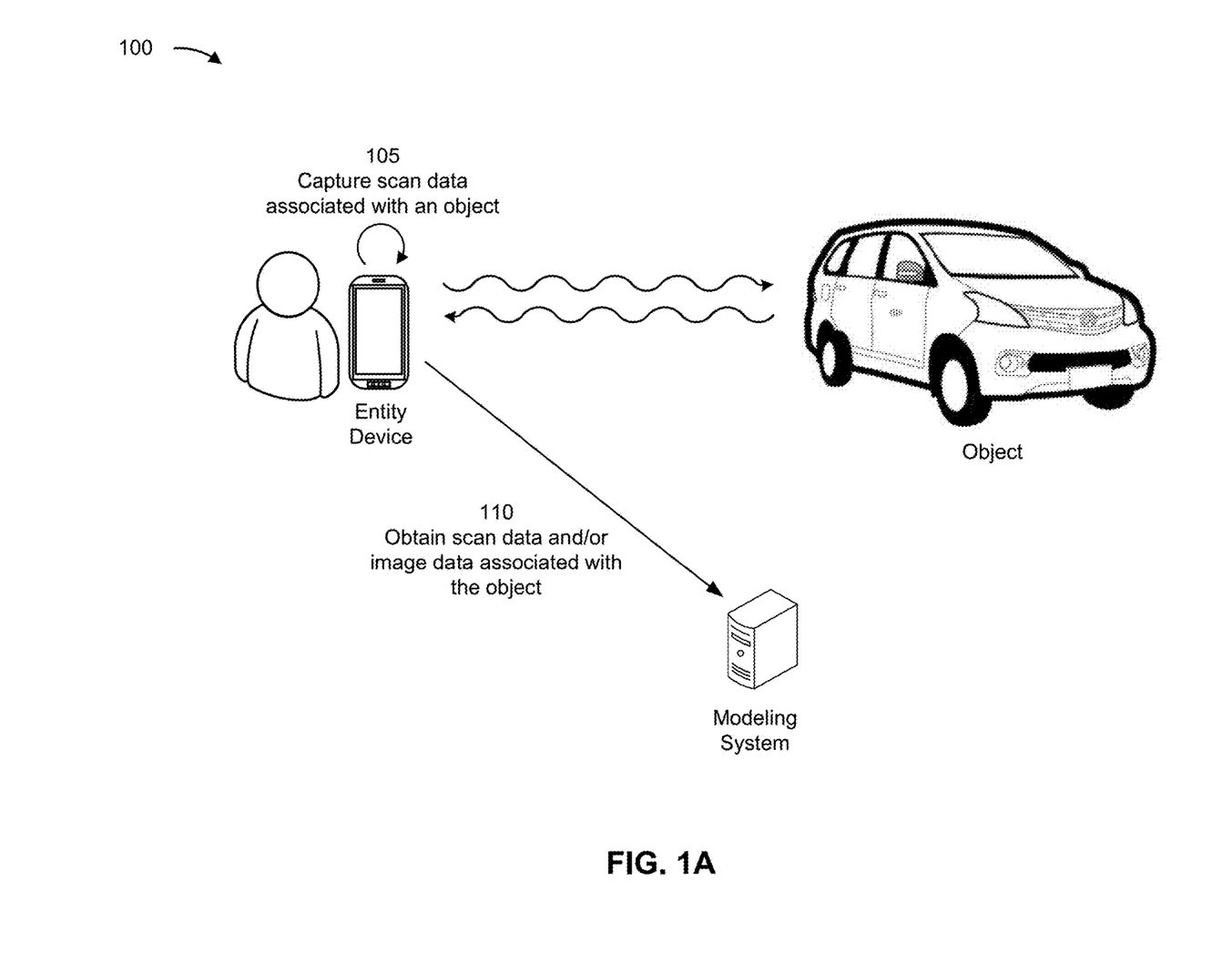
FIGS. 1A-1E are diagrams of an example associated with object damage identification using modeling based on three-dimensional scanning, in accordance with some embodiments of the present disclosure.

The entity device may be associated with an entity, such as an entity that offers objects, such as vehicles, for purchase. For example, the entity may be a vehicle dealership. The user device may be associated with a user interested in conducting a transaction with the entity in connection with an object (e.g., a vehicle), or that is otherwise interested in analyzing a condition of the object.

As shown in FIG. 1A, and by reference number 105, the entity device may capture scan data associated with an object (e.g., a vehicle). For example, the entity device may receive a user input indicating that the entity device is to initiate a scan capturing mode (e.g., associated with an application that executes on the entity device). In the scan capturing mode, the entity device may output a scanning signal (e.g., a light signal, a lidar signal, a structured light signal, an ultrasound signal, or the like) using a transmitter device (e.g., an optical source), and the entity device may process reflections of the scanning signal using a receiver device (e.g., a camera, a lidar receiver, a microphone, or the like) to capture the scan data. The transmitter device may be integrated in the entity device, or the transmitter device may be external to the entity device and communicatively connected to the entity device (e.g., a light emitting diode (LED) strip that can be plugged into and unplugged from a port of the entity device).

In the scan capturing mode, a user of the entity device may position the entity device and/or the object so that the object is in a field of view of the receiver device of the entity device. For larger objects, such as vehicles, the user of the entity device may sweep the entity device with respect to the object to capture the scan data. Here, the entity device may monitor a movement sensor (e.g., an accelerometer, a gyroscope, an inertial measurement unit (IMU), a global navigation satellite system (GNSS) receiver, or the like) of the entity device to detect a movement of the entity device (e.g., with respect to a reference point). Based on an association between the movement sensor data and collected scan data, the entity device can stitch together the collected scan data (e.g., which may be overlapping, collected out of order, or the like) into usable scan data.

The scan data may include a 3D representation of a surface of the object (e.g., an exterior surface and/or an interior surface). For example, the scan data may include deflectometry data, point cloud data (e.g., from lidar data, ultrasonic data, or the like), or another type of data that is representative of the object in three dimensions.

In the scan capturing mode, a progress indication may be presented in a user interface of the entity device while the entity device is collecting the scan data. For example, the progress indication may include a representation of the object (e.g., a generic representation of the object), such as a 3D model representative of the object, and the progress indication may provide visual distinguishing of regions of the representation of the object that have already been scanned.

In some implementations, the entity device may also capture image data associated with the object. The image data may include one or more images representative the object (e.g., a set of still images or video). The entity device may capture the image data in the scan capturing mode (e.g., concurrently with capturing the scan data). Additionally, or alternatively, the entity device may capture the image data prior to or after capturing the scan data.

As shown by reference number 110, the modeling system may obtain scan data and/or image data associated with the object. In some implementations, the modeling system may also obtain object information that identifies the object associated with the scan data and/or the image data (e.g., for a vehicle, the object information may identify a make, a model, and a year of the vehicle, a vehicle identification number (VIN), or the like).

In some implementations, after the entity device obtains the scan data and/or the image data, the entity device may transmit, and the modeling system may receive, the scan data and/or the image data. In some implementations, the modeling system may obtain the image data from a different device than the entity device and/or from a library of image data (e.g., that is stored by the modeling system). For example, the scan data is particular to the object, whereas the image data may be particular to the object or may relate to a representative object that is interchangeable with the object (e.g., the object and the representative object may be vehicles that are the same make, model, and year). In the description to follow, references to the object in connection with the image data may refer to the object or the representative object.

In some implementations, the entity device may also transmit, and the modeling system may also receive, the object information associated with the object. For example, a user of the entity device may input the object information to the entity device. Additionally, or alternatively, the modeling system may obtain the object information from the image data (e.g., that is particular to the object). For example, the image data may include an image depicting a unique identifier of the object (e.g., a VIN or a license plate), an image depicting one or more identifiers of the object (e.g., a make and a model), or the like. The modeling system may use image processing techniques (e.g., optical character recognition (OCR), computer vision, or the like) to identify the object information from the image data.

Figure 1B:
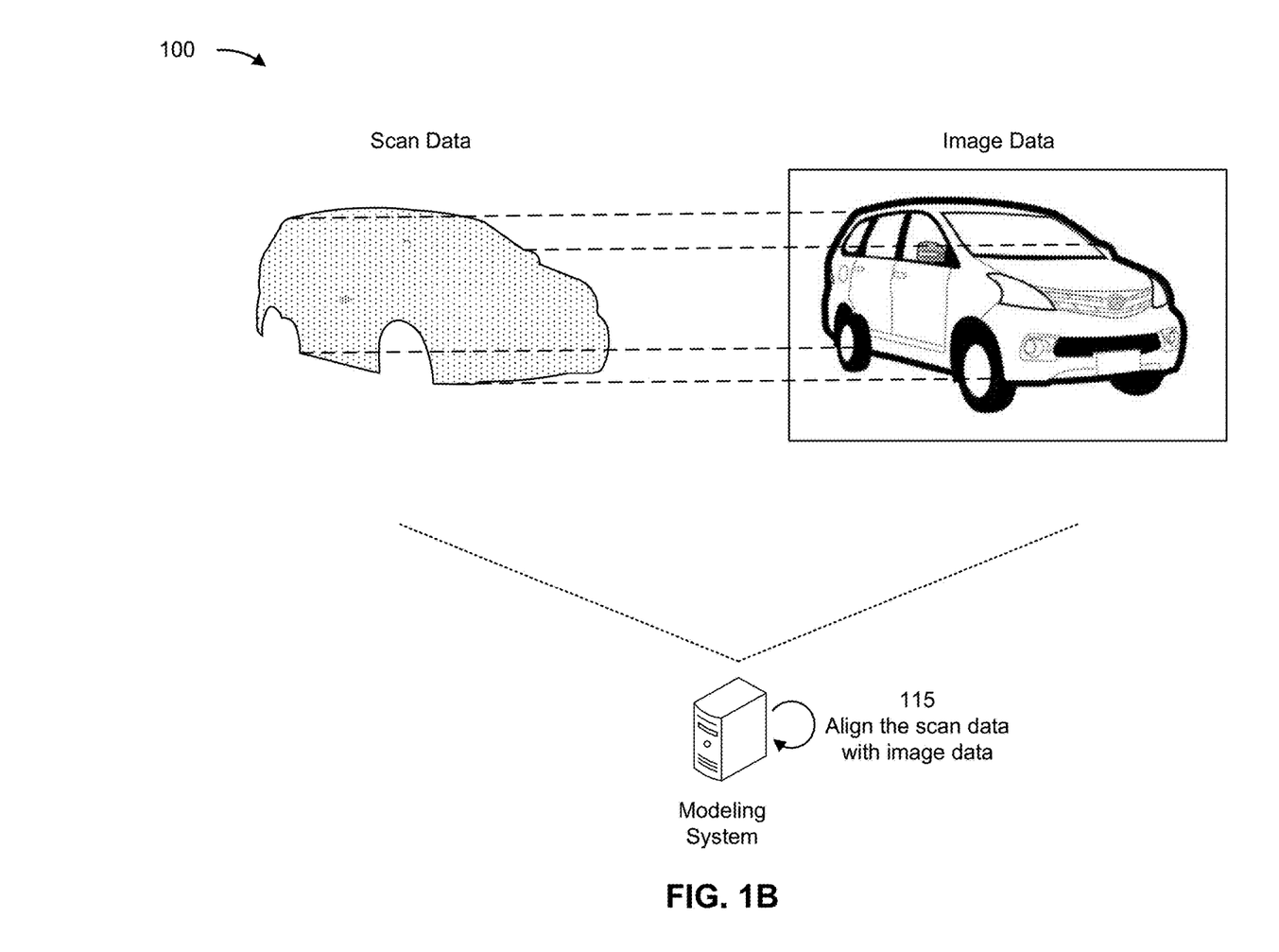

As shown in FIG. 1B, and by reference number 115, the modeling system may align the scan data with the image data. The modeling system may align the scan data with the image data to correlate the 3D representation of the surface of the object (of the scan data) with the one or more images of the object (of the image data). For example, the scan data and the image data may be spatially and geometrically aligned so that corresponding parts of the object align correctly in the scan data and the image data. As an example, alignment of the scan data and the image data may register a coordinate grid associated with the scan data to depictions of the object in one or more images of the image data. The modeling system may use one or more image registration techniques and/or image processing techniques to align the scan data with the image data. Alignment of the scan data and the image data enables the modeling system to identify correspondence between portions of the scan data and regions of the object depicted in the image data.

Figure 1C:
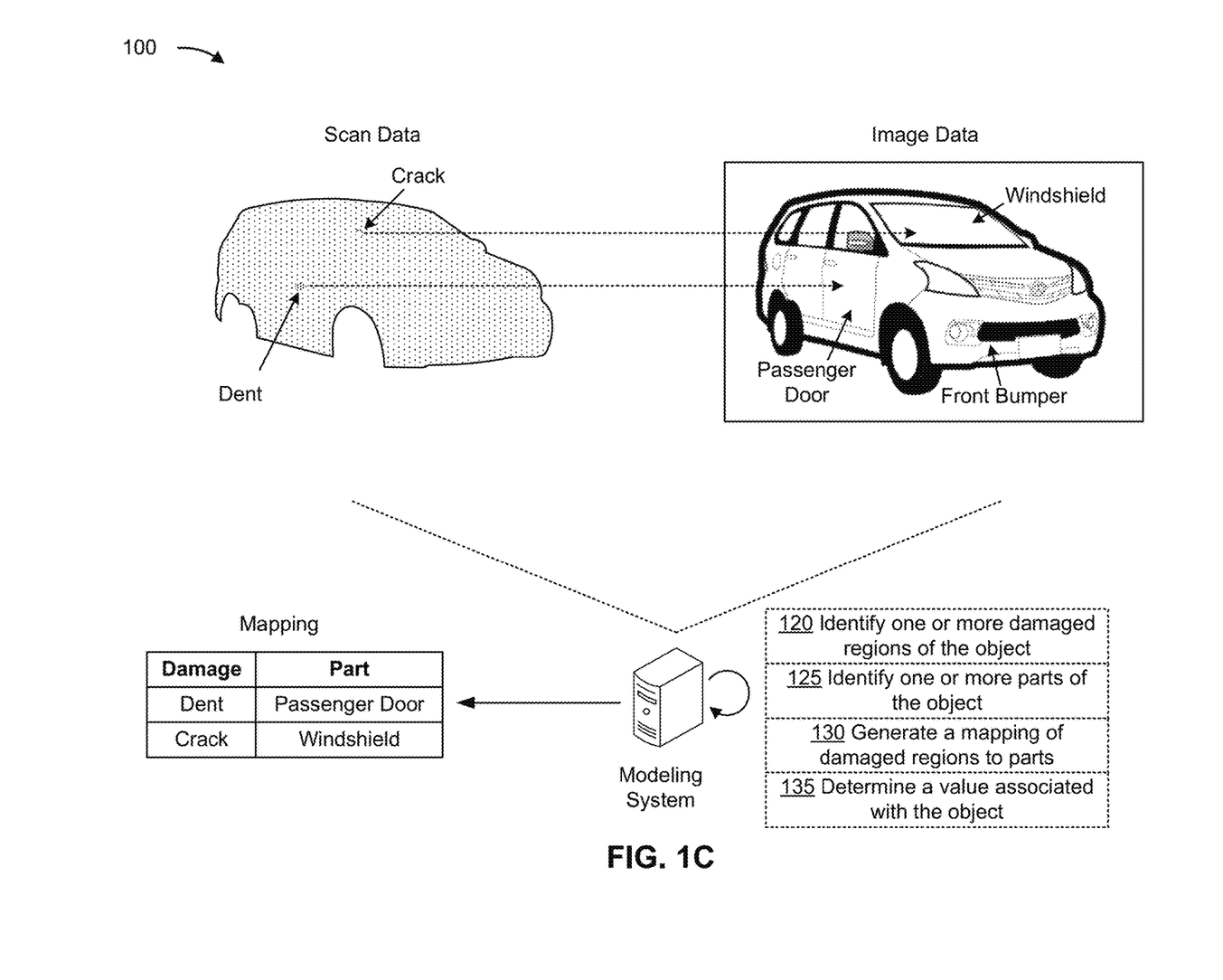

As shown in FIG. 1C, and by reference number reference number 120, the modeling system may identify, using the scan data, one or more damaged regions of the object. A damaged region of the object may be a region of the object associated with a scratch, a crack, a dent, a chip, discoloration, rust, or the like. Furthermore, when identifying a damaged region, the modeling system may identify, using the scan data, a type of damage associated with the damaged region (e.g., based on the scan data having particular characteristics or a particular signature in connection with the damaged region), a size (e.g., a surface area) of the damaged region, and/or a severity (e.g., a severity score) of damage associated with the damaged region. As an example, the modeling system may process the scan data to identify anomalous portions of the scan data that are indicative of damage. For example, anomalous portions of the scan data may be associated with abrupt changes in curvature on the surface of the object, abrupt changes in depth on the surface of the object, or the like.

In some implementations, the modeling system may identify the damaged region(s) of the object using one or more machine learning models. For example, the scan data may be an input to the one or more machine learning models, and the one or more machine learning models may be trained to output an indication of the damaged region(s) of the object (e.g., output a location of a damaged region with respect to a coordinate grid associated with the scan data) based on the input. In some implementations, the one or more machine learning models may include one or more support vector machine (SVM) models and/or one or more deep learning models (e.g., convolutional neural network (CNN) models and/or recurrent neural network (RNN) models) configured to identify the damaged region(s) from the scan data.

In some implementations, the one or more machine learning models may be trained based on historical data relating to repair of objects similar to the object (e.g., for vehicles, objects having the same make, model, and/or year as the object). For example, a repair center for the objects may use one or more devices to capture scans of the objects, in a similar manner as described above, before and after repair of the objects. As an example, a vehicle repair center may capture scans of vehicles (e.g., having body damage) before and after repair of the vehicles. Moreover, the repair center may provide (e.g., as inputs to the one or more devices) information associated with the repairs, such as a type of damage associated with a repair, a severity of damage associated with a repair, and/or a cost of a repair. Thus, the scans and corresponding repair information may form a training data set for the one or more machine learning models.

In some implementations, a before-scan and an after-scan captured in connection with a repair of an object may be used to analyze a quality of the repair. For example, the one or more devices of the repair center, used to capture the before-scan and the after-scan, may determine a quality of the repair based on the before-scan and the after-scan. As an example, the one or more devices may process the before-scan to identify one or more damaged regions of the object, as described herein, and the one or more devices may process the after-scan to determine an extent to which the damaged region(s) remain after repair (e.g., by comparing sizes of a detectable damaged region in the before-scan and the after-scan). Accordingly, the one or more devices may determine a quality score, or the like, associated with the repair based on the extent that the damaged region(s) remain after the repair. This functionality may incentivize the repair center to collect the training data set used for the one or more machine learning models.

As shown by reference number 125, the modeling system may identify, using the image data, one or more parts of the object. For example, for a vehicle, the modeling system may identify a front bumper, front headlights, a hood, a windshield, a fender, passenger-side tires, passenger-side doors, a passenger-side mirror, a gas cap, a quarter panel, or the like. As an example, the modeling system may process the image data using a computer vision technique to identify the one or more parts of the object.

In some implementations, the modeling system may identify the parts of the object using one or more machine learning models. For example, the image data may be an input to the one or more machine learning models, and the one or more machine learning models may be trained to output an indication of one or more parts of the object based on the input. In some implementations, the one or more machine learning models may include one or more computer vision models (e.g., one or more CNN models) to identify the one or more parts from the image data. The computer vision model(s) may be based on a computer vision technique, such as an image recognition technique (e.g., an Inception framework, a ResNet framework, a Visual Geometry Group (VGG) framework, or the like), an object detection technique (e.g. a Single Shot Detector (SSD) framework, a You Only Look Once (YOLO) framework, or the like), and/or an image segmentation technique, among other examples. In some implementations, when the image data is obtained by the modeling system from an image library, the one or more parts of the object may be labeled in the image data (e.g., the modeling system can identify the one or more parts of the object from the image data without processing the image data using a computer vision technique).

As shown by reference number 130, the modeling system may generate a mapping of the damaged region(s) of the object, identified from the scan data, to the parts of the object identified from the image data. For example, the modeling system may generate the mapping based on the alignment of the scan data and the image data, which enables the modeling system to identify where on the object the damage, identified from the scan data, is located. As an example, the mapping may indicate that there is damage (e.g., a crack, 2 centimeters in diameter) to a front windshield of a vehicle and damage (e.g., a dent, 1 centimeter deep) to a passenger-side door of the vehicle.

As shown by reference number 135, the modeling system may determine a value, associated with the object, that accounts for the one or more damaged regions of the object. For example, each of the damaged regions identified may have a respective detrimental effect on the object's value. The value determined by the modeling system may represent an estimate of a current market value of the object and/or an estimate of a cost to repair the damaged region(s) of the object. The modeling system may determine the value based on the mapping of damaged region(s) to parts of the object. For example, a dent on a vehicle's door may have a greater impact on a value of the vehicle than an impact due to a dent on a vehicle's rear bumper.

In some implementations, the modeling system may determine the value using the one or more machine learning models (e.g., trained based on the historical repair data). For example, the mapping as well as the object information may be an input to the one or more machine learning models, and the one or more machine learning models may be trained to output an indication of the value associated with the object based on the input. In some implementations, the one or more machine learning models may include one or more linear regression models, one or more decision tree models, one or more support vector regression (SVR) models, and/or one or more deep learning models (e.g., multilayer perceptron (MLP) models and/or RNN models) configured to identify the damaged region(s) from the scan data.

In some implementations, a machine learning model may be trained to determine the value based on an input of the scan data and/or the image data. That is, the machine learning model may be trained to determine the value using end-to-end deep learning. In some implementations, the modeling system may store information (e.g., in a data structure) identifying the scan data, the image data, the damaged region(s), the mapping, and/or the value in association with information identifying the object (e.g., a VIN). In some implementations, the entity device may perform one or more of the operations described above as being performed by the modeling system. For example, based on performing the one or more operations, the entity device may transmit information to the modeling system identifying the alignment of the scan data and the image data, the damaged region(s) of the object, the part(s) of the object, the mapping, and/or the value.

Figure 1D:
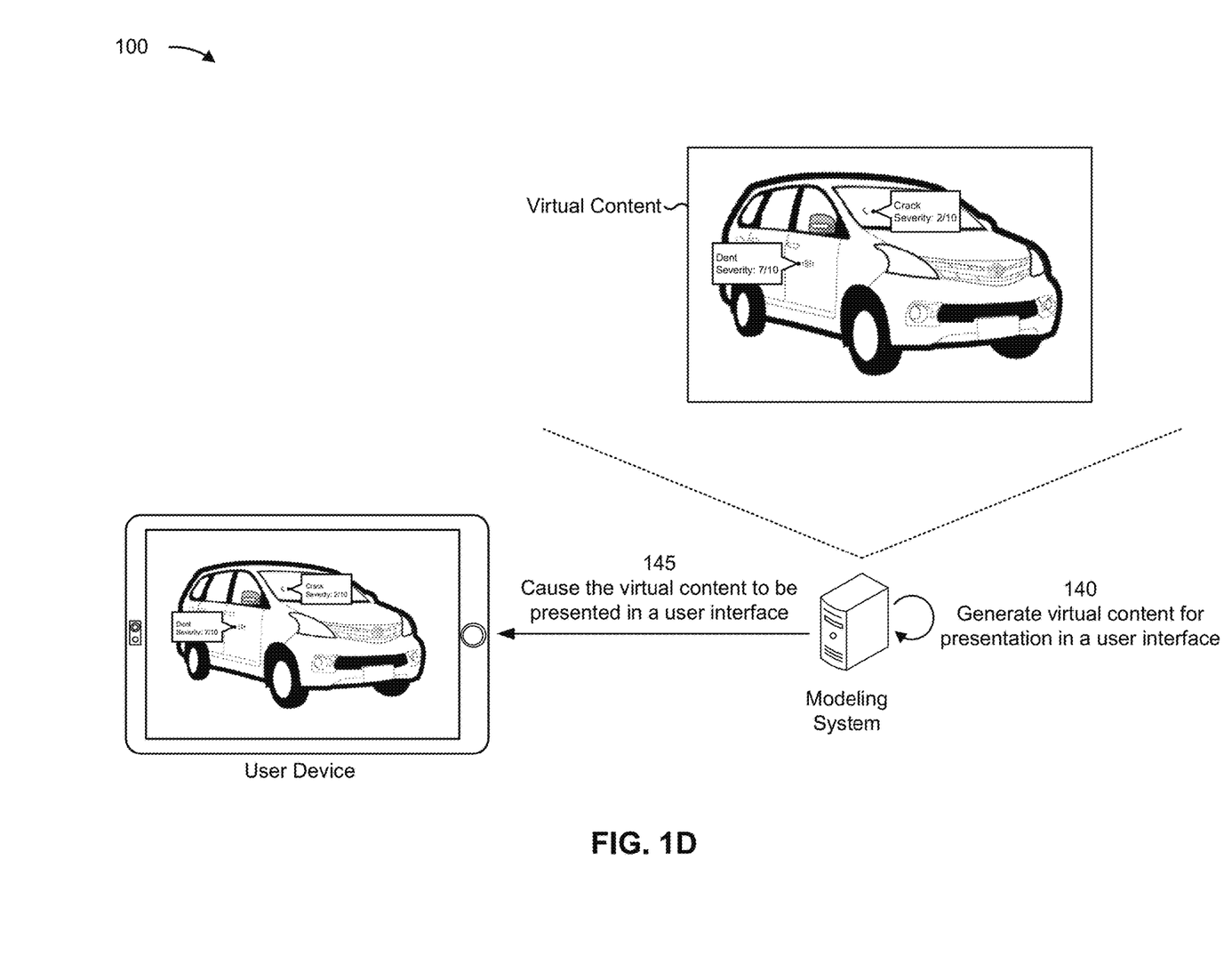

As shown in FIG. 1D, and by reference number 140, the modeling system may generate virtual content (e.g., a virtual showroom) for presentation in a user interface. The virtual content may include an object representation that includes the 3D representation of the surface of the object (e.g., rendered based on the scan data) and/or a 3D model representative of the object (e.g., a 3D model of a vehicle). The 3D model representative of the object may be based on the image data (e.g., the 3D model may be of the object itself). For example, the modeling system may generate the 3D model from the image data using a photogrammetry technique (e.g., a structure from motion (SfM) technique). Additionally, or alternatively, the modeling system may obtain the 3D model representative of the object from a library of 3D models (e.g., that is stored by the modeling system). For example, the 3D model may relate to a representative object that is interchangeable with the object, as described herein.

The 3D model representative of the object may be based on model data. In some implementations, the modeling system may align the scan data with the model data associated with the 3D model, in a similar manner as described above. Furthermore, based on the alignment of the scan data with the model data, the modeling system may generate the object representation to include an overlay of the 3D representation of the surface of the object on the 3D model. In some implementations, the modeling system may extract (e.g., from the scan data) one or more portions of the 3D representation of the surface that are associated with the damaged region(s), and the overlay may include just the one or more portions. Additionally, or alternatively, the modeling system remove (e.g., from the scan data) a portion of the 3D representation of the surface that is outside of the damaged region(s). In this way, the object representation may depict the damaged region(s) on the 3D model representative of the object. For example, an object representation of a vehicle may depict cracks, scratches, dents, or the like, on a 3D model representative of the vehicle. In some implementations, the virtual content may indicate the value associated with the object that accounts for the damaged region(s) of the object.

Moreover, the virtual content may include one or more content items (e.g., annotations, overlays, markers, superimposed graphics, or the like) arranged with respect to the object representation. For example, the one or more content items may indicate locations of the damaged region(s) with respect to the object representation. As an example, the one or more content items may be based on the mapping. Moreover, the one or more content items may indicate damage information associated with the damaged region(s). For example, the damage information may indicate a type of damage associated with a damaged region, a size (e.g., a surface area) of the damaged region, and/or a severity (e.g., a severity score) of damage associated with the damaged region.

In some implementations, the modeling system may generate, for the virtual content, a first content item for a location of a damaged region with respect to the object representation. The first content item may include a geometric shape (e.g., a circle, a square, a triangle, and/or the like) for display at the location of the damaged region. In some implementations, the modeling system may generate different types of content items for different types of damage (e.g., a scratch, crack, dent, discoloration, rust, or the like). For example, the modeling system may generate a circle when the damage is a scratch and a square when the damage is a dent. Additionally, or alternatively, the content items may vary by color, size, pattern, or the like, based on the type of damage. In this way, the modeling system may generate similar content items for similar types of damage and/or different content items for different types of damage.

In some implementations, the modeling system may generate, for the virtual content, a second content item with information relating to the damaged region. The second content item may include a text overlay, a text box, an image overlay, a modal, or the like, that includes a description of the damage. In some implementations, the second content item may be based on the damage information associated with the damaged region. Additionally, or alternatively, the second content item may include a zoomed-in depiction of a portion of the 3D representation of the surface of the object associated with the damaged region, or a close-up image of the damaged region extracted from the image data. Additionally, or alternatively, the second content item may include context information associated with the damage of the damaged region. For example, for a vehicle, the context information may indicate one or more events of an accident history associated with the vehicle and/or one or more events of a repair history associated with the vehicle.

As an example, the modeling system may obtain the context information by transmitting a request (e.g., an application programming interface (API) request) indicating the unique identifier of the object to a remote device (e.g., that implements an object history information service), and receiving, from the remote device in response to the request, object history information associated with the object (e.g., an accident history associated with the object, a repair history associated with the object, an insurance claim history associated with the object, or the like). Moreover, the modeling system may process the object history information to identify one or more events to include in the context information for the damaged region. For example, the modeling system may process the object history information using a natural language processing (NLP) technique to identify the one or more events. As an example, if the damaged region is associated with a front windshield of a vehicle, the modeling system process the object history information, using the NLP technique, to identify one or more events that mention or relate to the front windshield of the vehicle.

In some implementations, the modeling system may generate the second content item arranged, with respect to the object representation, nearer to the location of the damaged region than to a location of any other damaged region, but not overlapping the damaged region or any other damaged region. In some implementations, the modeling system may generate the second content item with a configuration that causes the second content item to be hidden until a user interaction (e.g., a mouseover event, or the like) is targeted to the first content item or a portion of the overlay depicting the damage of the damaged region. The configuration may cause the second content item to be unhidden based on the user interaction.

As shown by reference number 145, the modeling system may cause the virtual content to be presented in a user interface of the user device. For example, the modeling system may transmit the virtual content to the user device to cause the virtual content to be presented in the user interface of the user device. The virtual content may include controls to enable rotation of the object representation, zooming into the object representation, or the like. The user interface may be a web browser, or a user interface in a virtual reality environment or an augmented reality environment. In some implementations, the user device may be provisioned with a 3D rendering application (e.g., a web browser plugin or extension) capable of rendering the object representation to enable display of the object representation in the user interface. In some implementations, the entity device and the user device may be the same device (e.g., the device that captured the scan data may also receive and present the virtual content in a user interface).

Figure 1E:
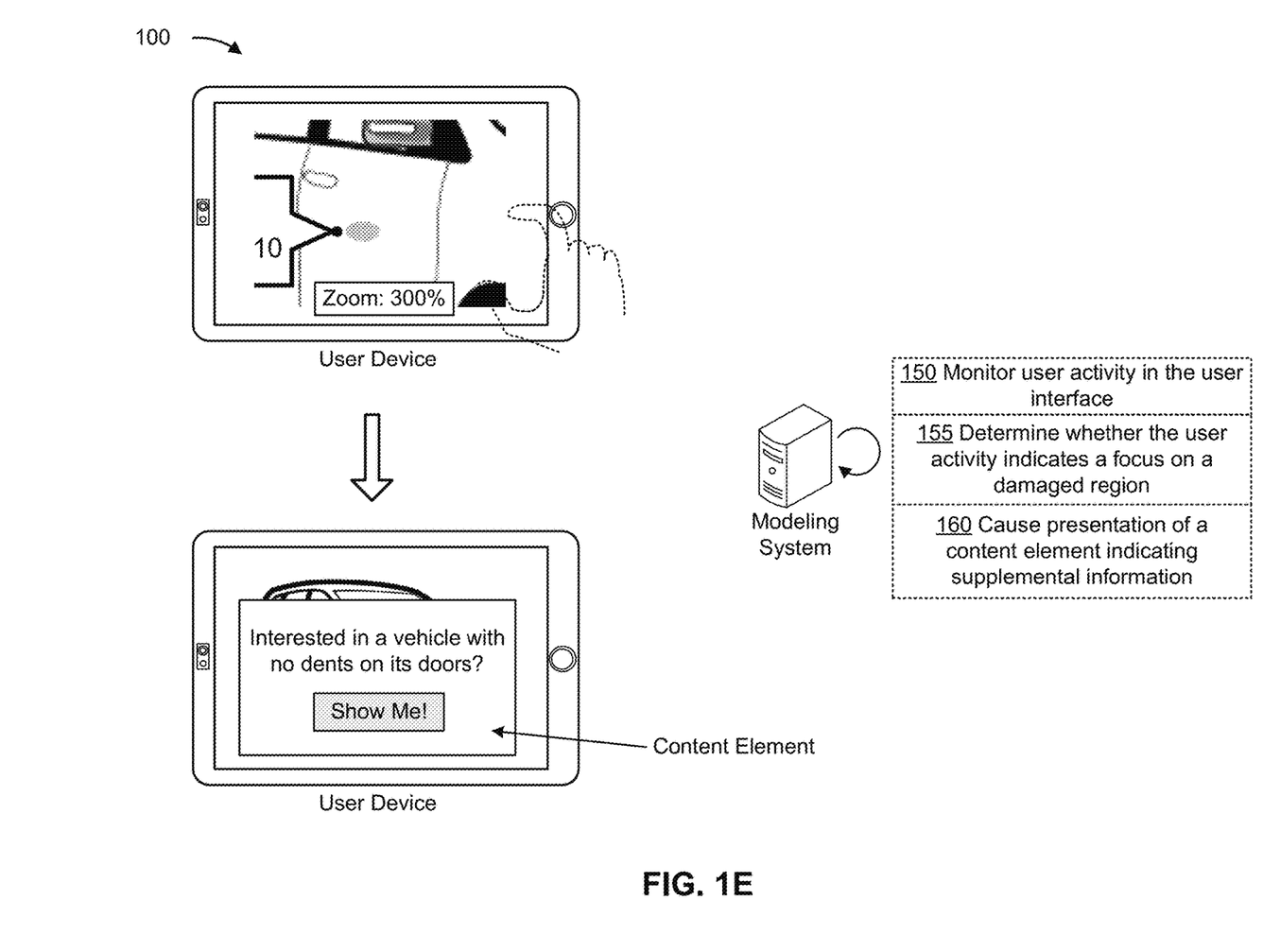

As shown in FIG. 1E, and by reference number 150, the modeling system may monitor user activity in the user interface. For example, the modeling system may monitor the activity of a user of the user device with respect to the virtual content presented in the user interface. The user activity may include mousing over one or more areas of the virtual content, clicking on one or more areas of the virtual content, zooming into one or more areas of the virtual content, maintaining the user interface fixed on an area of the virtual content, interacting with one or more first content items of the virtual content, and/or interacting with one or more second content items of the virtual content. To monitor the user activity, the modeling system may monitor which areas of the virtual content are being interacted with, which areas of the virtual content are being zoomed into, zoom levels used to zoom into areas of the virtual content, which areas of the virtual content the user interface is being maintained fixed onto, and/or time durations for which the user interface is maintained fixed onto areas of the virtual content, among other examples.

As shown by reference number 155, the modeling system may determine, based on monitoring the user activity, whether the user activity indicates a focus, by the user, on a damaged region of the object. For example, the user activity may indicate the focus on the damaged region if the user is zooming into the damaged region at a high zoom level and/or if the user is maintaining the user interface fixed on the damaged region for an extended time period (e.g., an amount of time that satisfies a threshold). In some implementations, the modeling system may generate a user profile for the user that identifies the user activity and/or identifies types and/or locations of damaged regions that the user has focused on, and the modeling system may store information (e.g., in a data structure) identifying the user profile in association with information identifying the user (e.g., a user identifier). In this way, the user profile may be referenced and/or supplemented across different sessions of the user. In some implementations, based on the user activity indicating the focus on the damaged region, the modeling system may cause presentation, in the user interface, of a prompt requesting a user input indicating a level of concern associated with the damaged region (e.g., "Are you concerned about the condition of the windshield of this vehicle?"). The user input may provide confirmation as to whether the damaged region is a cause for concern by the user (e.g., that may dissuade the user from conducting a transaction for the object).

As shown by reference number 160, based on the user activity indicating the focus on the damaged region and/or the level of concern satisfying a threshold or having a particular value, the modeling system may cause presentation, in the user interface, of a content element (e.g., a text box, a text overlay, or the like) indicating supplemental information. In some implementations, the supplemental information may indicate an explanation for the damaged region (e.g., similar to the context information, described above) or indicate an estimate for repairing the damaged region. In some implementations, the modeling system may generate communication session information for a communication session between the user and a repair center, and the supplemental information may include the communication session information (e.g., the user and the repair center can discuss repairing the damaged region during the communication session). In some implementations, the modeling system may generate a request to repair the damaged region, and the modeling system may transmit the request to a device associated with a repair center. The request may indicate a calendar invitation for a repair appointment and/or may indicate the estimate for repairing the damaged region.

In some implementations, the supplemental information may indicate a recommendation of a different object for the user. For example, the recommendation may be for a different object that is interchangeable with the object (e.g., a vehicle of the same make, model, and year), but that does not have a similar damaged region as the object, has fewer damaged regions than the object, has one or more damaged regions associated with a lower severity level than a severity level of the one or more damaged regions of the object (e.g., at similar locations on the object), has damaged regions associated with a repair value that is less than a repair value associated with the damaged regions of the object, or the like. The recommendation may include a link configured to cause presentation of virtual content, associated with the different object, in the user interface. In some implementations, based on the user activity indicating the focus on the damaged region and/or the level of concern satisfying a threshold or having a particular value, the modeling system may generate, in a similar manner as described above, new virtual content associated with the different object for presentation in the user interface, and the modeling system may cause presentation of the new virtual content in the user interface (e.g., automatically, without a user input indicating interest in the different object).

In some implementations, the modeling system may receive from the user device, via the user interface, a request to conduct a transaction for the object (e.g., purchase the object), a request to schedule a trial of the object (e.g., a test drive of a vehicle), a request for financing in connection with a transaction for the object, or the like.

By using a combination of image processing, 3D scanning, and/or 3D modeling, the modeling system may identify the damaged regions of the object with a high degree of accuracy. Furthermore, using techniques described herein, the modeling system may be capable of differentiating the damaged regions from intentional features of the object and/or identifying locations on the object where the damaged reasons are present. Accordingly, the modeling system provides improved detection of damage to an object, thereby efficiently utilizing computing resources used for damage detection.

As indicated above, FIGS. 1A-1E are provided as an example. Other examples may differ from what is described with regard to FIGS. 1A-1E.

Figure 2:
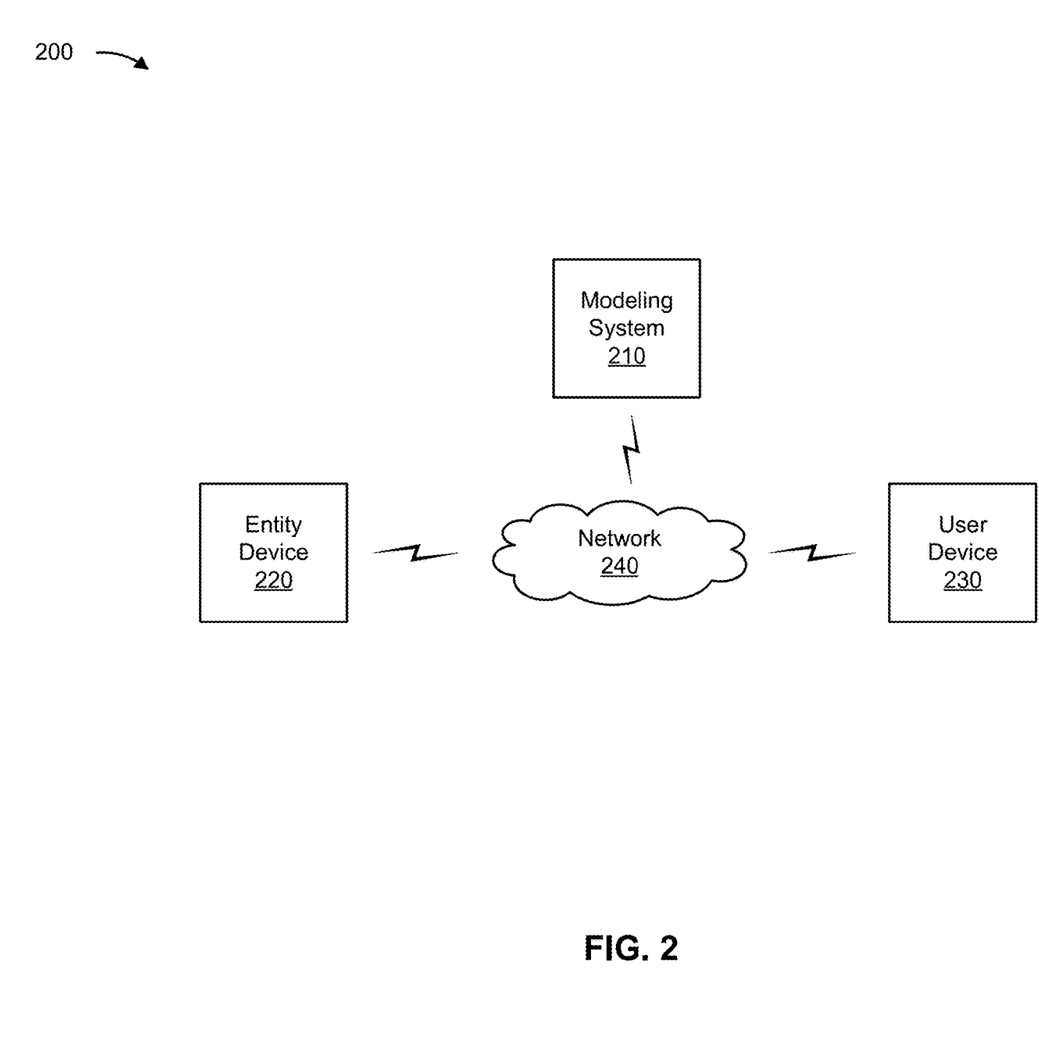
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a modeling system 210, an entity device 220, a user device 230, and a network 240. Devices of environment 200 may interconnect via wired connections, wireless connections, or a combination of wired and wireless connections.

The modeling system 210 may include one or more devices capable of receiving, generating, storing, processing, providing, and/or routing information associated with object damage identification using modeling based on 3D scanning, as described elsewhere herein. The modeling system 210 may include a communication device and/or a computing device. For example, the modeling system 210 may include a server, such as an application server, a client server, a web server, a database server, a host server, a proxy server, a virtual server (e.g., executing on computing hardware), or a server in a cloud computing system. In some implementations, the modeling system 210 may include computing hardware used in a cloud computing environment.

The entity device 220 may include one or more devices capable of receiving, generating, storing, processing, and/or providing information associated with 3D scanning of an object, as described elsewhere herein. The entity device 220 may include a communication device and/or a computing device. For example, the entity device 220 may include a wireless communication device, a mobile phone, a user equipment, a laptop computer, a tablet computer, a wearable communication device (e.g., a smart wristwatch, a pair of smart eyeglasses, a head mounted display, or a virtual reality headset), or a similar type of device.

The user device 230 may include one or more devices capable of receiving, generating, storing, processing, and/or providing information associated with presentation of virtual content in a user interface, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
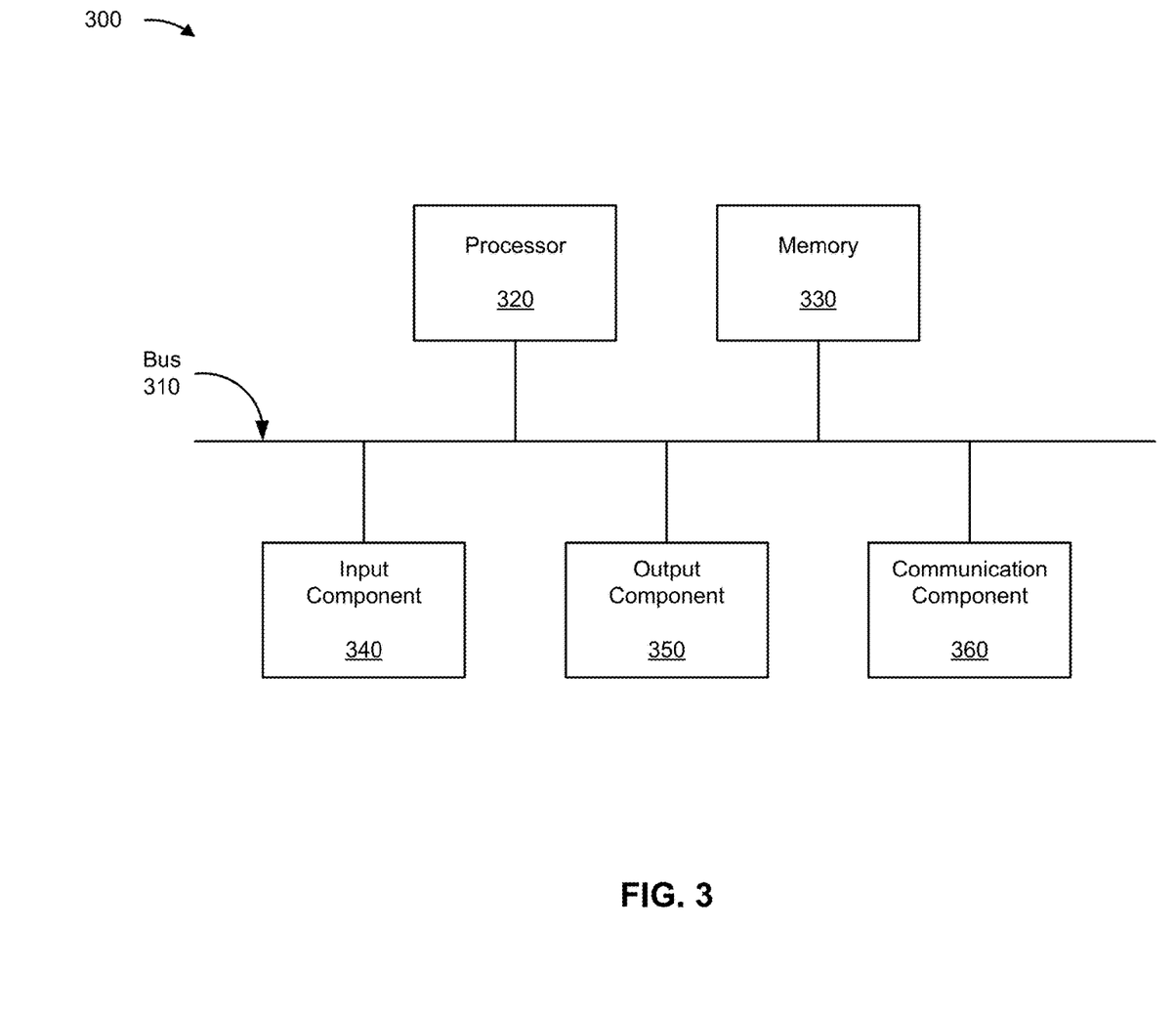
FIG. 3 is a diagram of example components of a device associated with object damage identification using modeling based on three-dimensional scanning, in accordance with some embodiments of the present disclosure.

FIG. 3 is a diagram of example components of a device 300 associated with object damage identification using modeling based on 3D scanning. The device 300 may correspond to modeling system 210, entity device 220, and/or user device 230. In some implementations, modeling system 210, entity device 220, and/or user device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
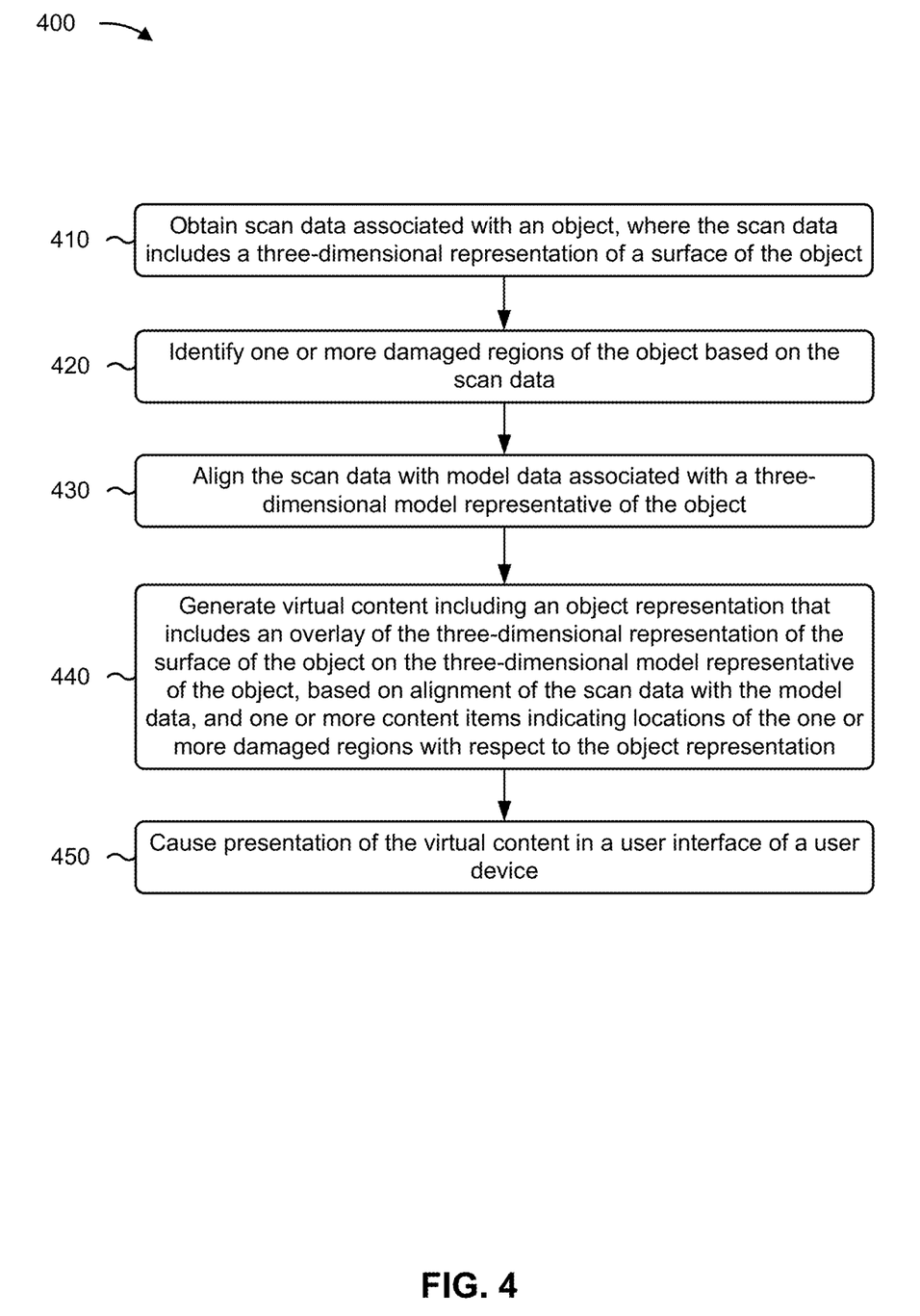
FIG. 4 is a flowchart of an example process associated with object damage identification using modeling based on three-dimensional scanning, in accordance with some embodiments of the present disclosure.

FIG. 4 is a flowchart of an example process 400 associated with object damage identification using modeling based on 3D scanning. In some implementations, one or more process blocks of FIG. 4 may be performed by the modeling system 210. In some implementations, one or more process blocks of FIG. 4 may be performed by another device or a group of devices separate from or including the modeling system 210, such as the entity device 220 and/or the user device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining scan data associated with an object, where the scan data includes a 3D representation of a surface of the object (block 410). For example, the modeling system 210 (e.g., using processor 320, memory 330, input component 340, and/or communication component 360) may obtain scan data associated with an object, as described above in connection with reference number 110 of FIG. 1A. As an example, the scan data may include deflectometry data, point cloud data (e.g., from lidar data, ultrasonic data, or the like), or another type of data that is representative of the object in three dimensions.

As further shown in FIG. 4, process 400 may include identifying one or more damaged regions of the object based on the scan data (block 420). For example, the modeling system 210 (e.g., using processor 320 and/or memory 330) may identify one or more damaged regions of the object based on the scan data, as described above in connection with reference number 120 of FIG. 1C. As an example, the one or more damaged regions of the object may be identified using one or more machine learning models.

As further shown in FIG. 4, process 400 may include aligning the scan data with model data associated with a 3D model representative of the object (block 430). For example, the modeling system 210 (e.g., using processor 320 and/or memory 330) may align the scan data with model data associated with a 3D model representative of the object, as described above in connection with reference number 140 of FIG. 1D. As an example, the scan data may be aligned with the model data to correlate the 3D representation of the surface of the object (of the scan data) with the 3D model representative of the object (of the model data).

As further shown in FIG. 4, process 400 may include generating virtual content including: an object representation that includes an overlay of the 3D representation of the surface of the object on the 3D model representative of the object, based on alignment of the scan data with the model data; and one or more content items indicating locations of the one or more damaged regions with respect to the object representation (block 440). For example, the modeling system 210 (e.g., using processor 320 and/or memory 330) may generate virtual content, as described above in connection with reference number 140 of FIG. 1D. As an example, the one or more content items may indicate damage information associated with the one or more damaged regions, such as a type of damage associated with a damaged region, a size (e.g., a surface area) of the damaged region, and/or a severity (e.g., a severity score) of damage associated with the damaged region.

As further shown in FIG. 4, process 400 may include causing presentation of the virtual content in a user interface of a user device (block 450). For example, the modeling system 210 (e.g., using processor 320, memory 330, output component 350, and/or communication component 360) may cause presentation of the virtual content in a user interface of a user device, as described above in connection with reference number 145 of FIG. 1D. As an example, the virtual content may be transmitted to the user device to cause the virtual content to be presented in the user interface of the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for object damage identification, the system comprising:
   one or more memories; and
   one or more processors, coupled to the one or more memories, configured to:
   obtain scan data associated with an object,
     wherein the scan data includes a three-dimensional representation of a surface of the object;
   identify, using one or more machine learning models, one or more damaged regions of the object based on the scan data;
   align the scan data with model data associated with a three-dimensional model representative of the object;
   generate virtual content including:

an object representation that includes an overlay of the three-dimensional representation of the surface of the object on the three-dimensional model representative of the object, based on alignment of the scan data with the model data, and one or more content items indicating locations of the one or more damaged regions with respect to the object representation;

cause presentation of the virtual content in a user interface of a user device;

monitor user activity in the user interface; and determine whether the user activity indicates a focus on a damaged region of the one or more damaged regions.

2. The system of claim 1, wherein the one or more processors are further configured to:

cause, based on the user activity indicating the focus on the damaged region, presentation, in the user interface, of a prompt requesting a user input indicating a level of concern associated with the damaged region.

3. The system of claim 1, wherein the one or more processors are further configured to:

cause, based on the user activity indicating the focus on the damaged region, presentation, in the user interface, of information indicating a recommendation of a different object.

4. The system of claim 1, wherein the one or more processors are further configured to:

obtain image data including one or more images representative of the object;

identify, using the one or more machine learning models, one or more parts of the object based on the image data;

align the scan data with the image data to correlate the three-dimensional representation of the surface of the object with the one or more images representative of the object; and generate a mapping of the one or more damaged regions to the one or more parts, wherein the one or more content items are based on the mapping.

5. The system of claim 1, wherein the one or more processors are further configured to:

determine, using the one or more machine learning models and based on the one or more damaged regions of the object, a value associated with the object that accounts for the one or more damaged regions of the object, wherein the virtual content indicates the value.

6. The system of claim 1, wherein the scan data includes deflectometry data or point cloud data.

7. The system of claim 1, wherein the one or more machine learning models are trained based on historical data relating to repair of objects similar to the object.

8. The system of claim 1, wherein the one or more processors are further configured to:

transmit the virtual content to the user device.

9. A method of object damage identification, comprising:

obtaining, by a device, scan data associated with an object, wherein the scan data includes a three-dimensional representation of a surface of the object;

identifying, by the device, one or more damaged regions of the object based on the scan data;

aligning, by the device, the scan data with model data associated with a three-dimensional model representative of the object;

generating, by the device, virtual content including:

an object representation that includes an overlay of the three-dimensional representation of the surface of the object on the three-dimensional model representative of the object, based on alignment of the scan data with the model data, and one or more content items indicating locations of the one or more damaged regions with respect to the object representation;

causing, by the device, presentation of the virtual content in a user interface of a user device;

monitoring, by the device, user activity in the user interface; and determining, by the device, whether the user activity indicates a focus on a damaged region of the one or more damaged regions.

10. The method of claim 9, wherein causing presentation of the virtual content in the user interface comprises:

transmitting the virtual content to the user device.

11. The method of claim 9, further comprising:

causing, based on a determination that the user activity indicates the focus on the damaged region, presentation of a content element indicating supplemental information in the user interface.

12. The method of claim 9, wherein identifying the one or more damaged regions comprises:

identifying the one or more damaged regions and types of damage associated with the one or more damaged regions.

13. The method of claim 9, further comprising:

determining, based on the one or more damaged regions of the object, a value associated with the object that accounts for the one or more damaged regions of the object, wherein the virtual content indicates the value.

14. The method of claim 9, wherein the scan data includes deflectometry data or point cloud data.

15. The method of claim 9, wherein the object is a vehicle.

16. A non-transitory computer-readable medium storing a set of instructions for object damage identification, the set of instructions comprising:

one or more instructions that, when executed by one or more processors of a device, cause the device to:

obtain scan data associated with an object, wherein the scan data includes a three-dimensional representation of a surface of the object;

identify one or more damaged regions of the object based on the scan data; generate virtual content including:

an object representation that includes at least one of the three-dimensional representation of the surface of the object or a three-dimensional model representative of the object, and one or more content items indicating locations of the one or more damaged regions with respect to the object representation; cause presentation of the virtual content in a user interface of a user device;

monitor user activity in the user interface; and determine whether the user activity indicates a focus on a damaged region of the one or more damaged regions.

17. The non-transitory computer-readable medium of claim 16, wherein the one or more instructions, that cause the device to generate the virtual content, cause the device to:

align the scan data with model data associated with the three-dimensional model; and generate, based on alignment of the scan data with the model data, the object representation to include an overlay of the three-dimensional representation of the surface of the object on the three-dimensional model representative of the object.

18. The non-transitory computer-readable medium of claim 16, wherein the one or more instructions, when executed by the one or more processors, further cause the device to:

determine, based on the one or more damaged regions of the object, a value associated with the object that accounts for the one or more damaged regions of the object, wherein the virtual content indicates the value.

19. The non-transitory computer-readable medium of claim 16, wherein the one or more instructions, when executed by the one or more processors, further cause the device to:

cause, based on a determination that the user activity indicates the focus on the damaged region, presentation of a content element indicating supplemental information in the user interface.

20. The non-transitory computer-readable medium of claim 16, wherein the user interface is in a virtual reality environment.

\* \* \* \* \*